(12) United States Patent
Lockwood et al.

(10) Patent No.: US 10,604,079 B2
(45) Date of Patent: Mar. 31, 2020

(54) HANDLE-INTEGRATED HANGER

(71) Applicant: Ford Global Technologies, LLC, Dearborn, MI (US)

(72) Inventors: Christopher Jacob Lockwood, Ann Arbor, MI (US); James Hadley Muiter, Plymouth, MI (US); Aaron Halonen, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 15/686,278

(22) Filed: Aug. 25, 2017

(65) Prior Publication Data
US 2019/0061631 A1   Feb. 28, 2019

(51) Int. Cl.
*B60R 7/10* (2006.01)
*F16M 13/02* (2006.01)
*B60N 3/02* (2006.01)

(52) U.S. Cl.
CPC ............ *B60R 7/10* (2013.01); *B60N 3/02* (2013.01); *F16M 13/022* (2013.01); *F16M 2200/021* (2013.01)

(58) Field of Classification Search
CPC .......... B60R 7/10; B60N 3/02; F16M 13/022; F16M 2200/021
See application file for complete search history.

(56) References Cited

U.S. PATENT DOCUMENTS

| | | | | |
|---|---|---|---|---|
| 2,500,881 | A | * | 3/1950 | Stader ............... A47G 25/08 |
| | | | | 211/100 |
| 2,706,049 | A | * | 4/1955 | Andrews ............ B60R 7/10 |
| | | | | 211/104 |
| 3,386,589 | A | | 6/1968 | Prete, Jr. |
| 5,104,083 | A | | 4/1992 | Shannon |
| 5,328,068 | A | * | 7/1994 | Shannon ............ B60R 7/10 |
| | | | | 211/113 |
| 5,625,921 | A | | 5/1997 | Smith |
| 6,076,233 | A | * | 6/2000 | Sasaki ............... B60N 3/026 |
| | | | | 16/438 |
| 6,397,435 | B1 | | 6/2002 | Gosselet |
| 6,643,897 | B2 | | 11/2003 | Chang |
| 7,988,115 | B2 | * | 8/2011 | Lee .................... B60R 7/10 |
| | | | | 16/438 |
| 9,079,542 | B1 | | 7/2015 | Ross et al. |

FOREIGN PATENT DOCUMENTS

EP     0753427 A2     1/1997

\* cited by examiner

*Primary Examiner* — Anita M King
(74) *Attorney, Agent, or Firm* — David Coppiellie; Price Heneveld LLP

(57) ABSTRACT

A handle-integrated hanger includes a grab handle, a garment hanger pivotably coupled to the grab handle at a first end, and a rotational brake that prevents over-rotation of the garment hanger.

20 Claims, 17 Drawing Sheets

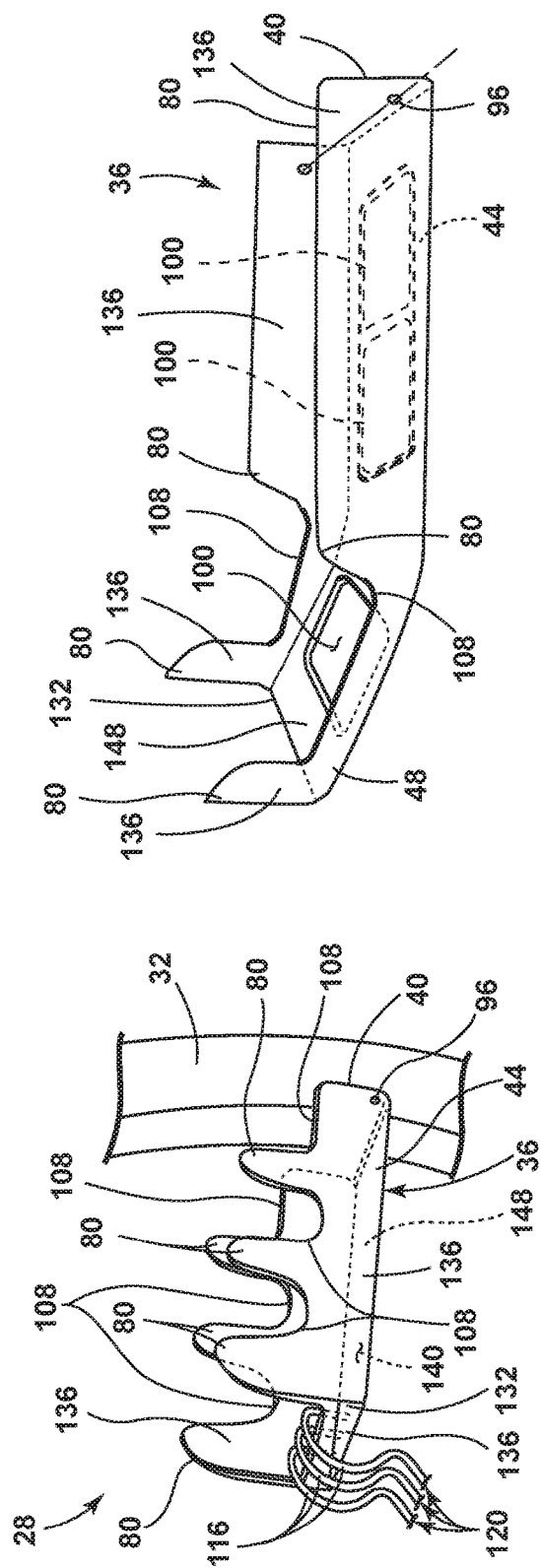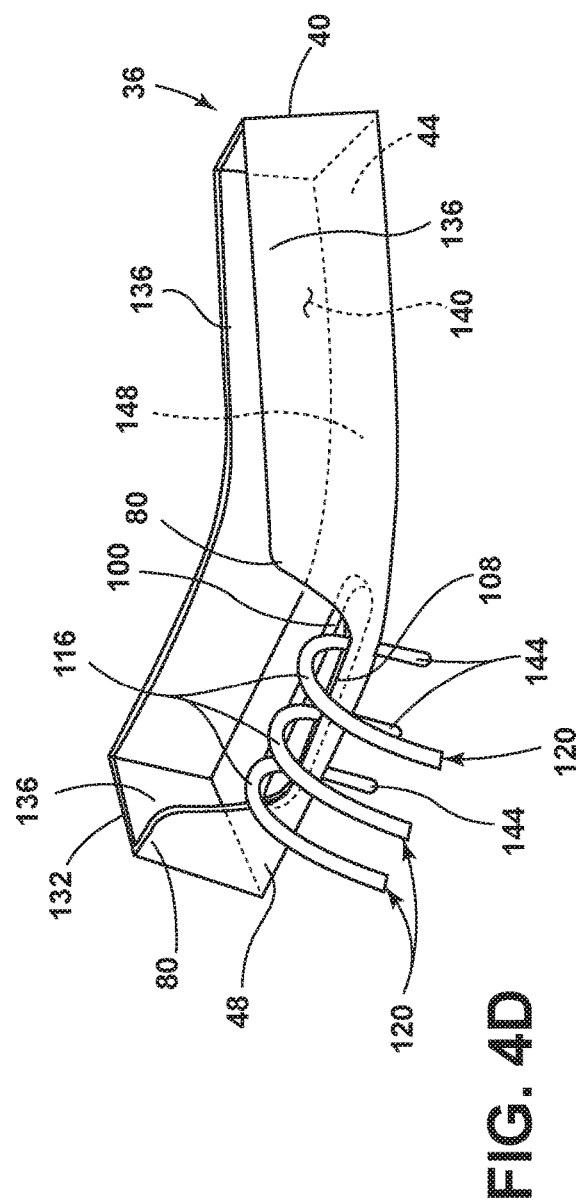

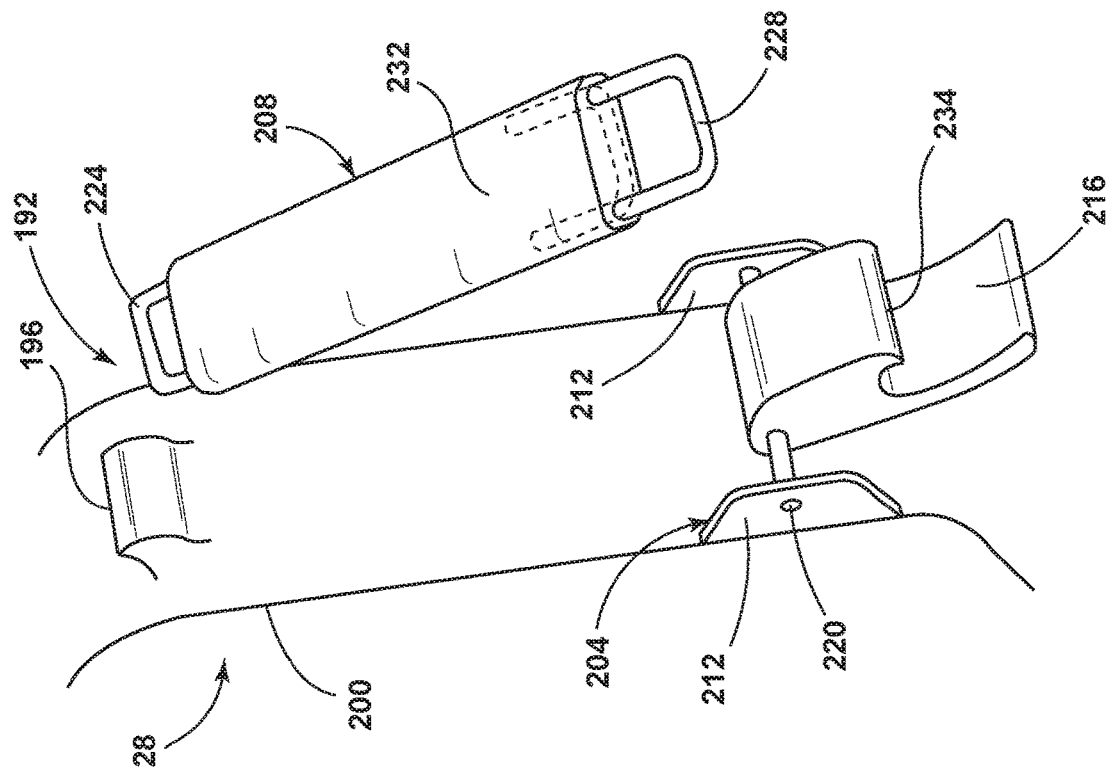
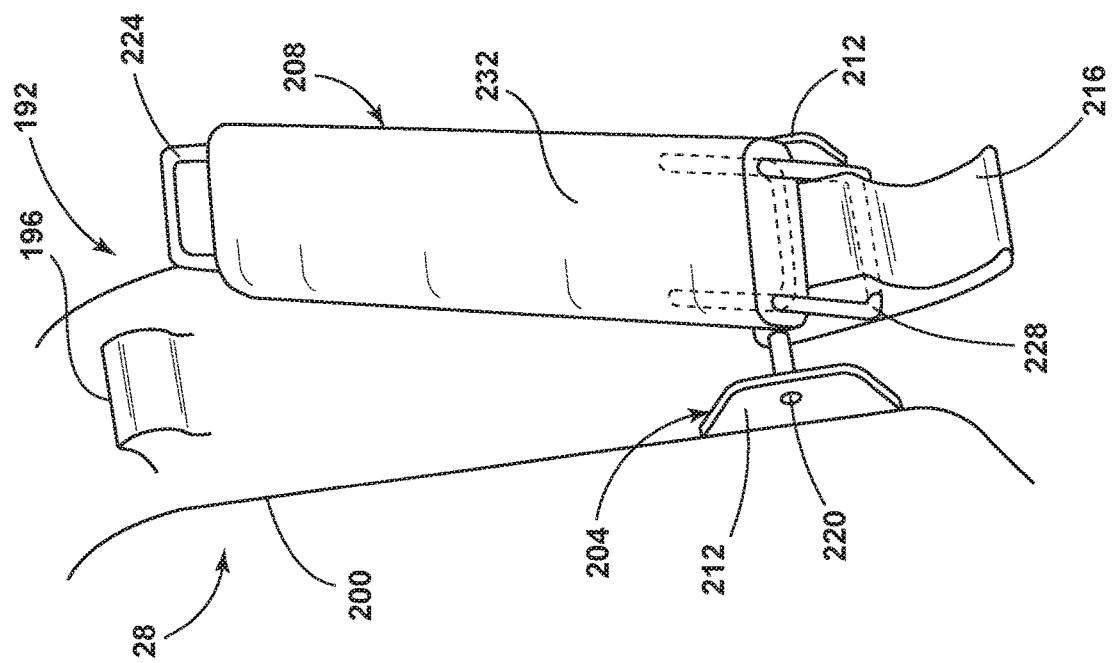

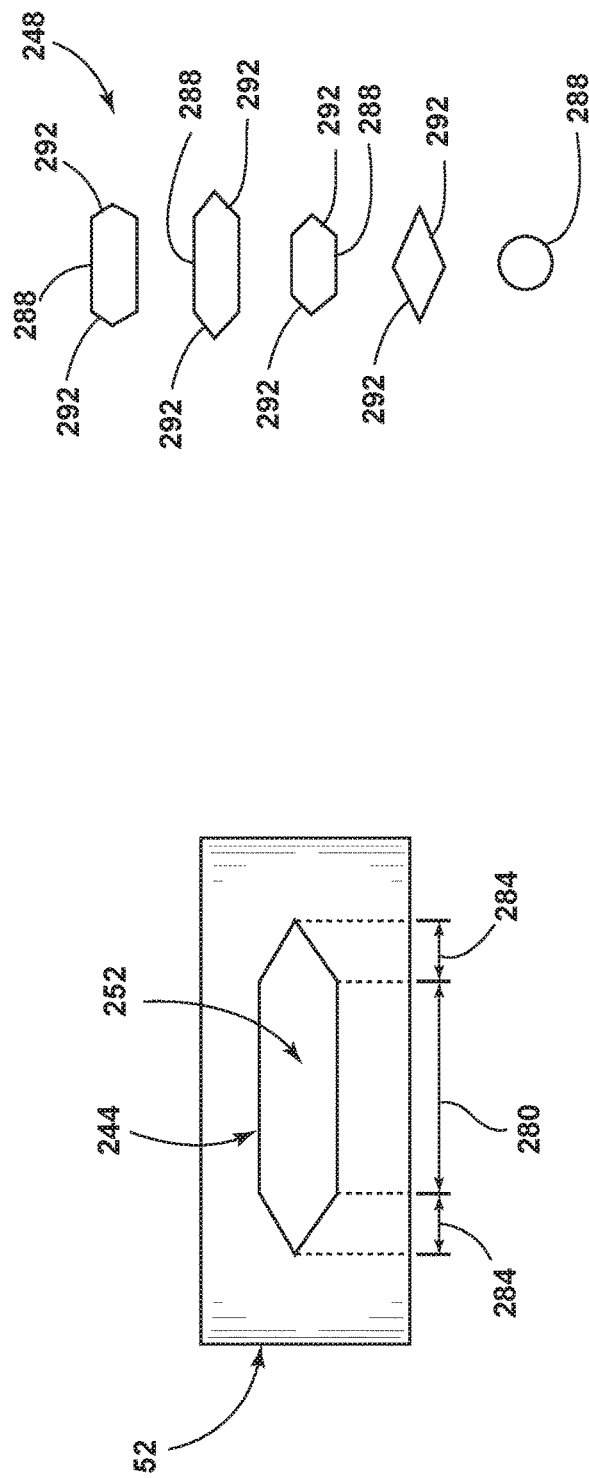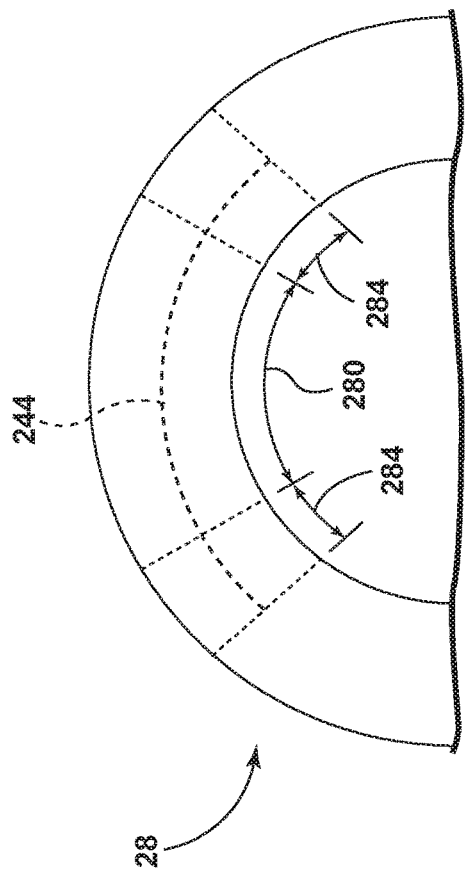
FIG. 14A
FIG. 14B
FIG. 15

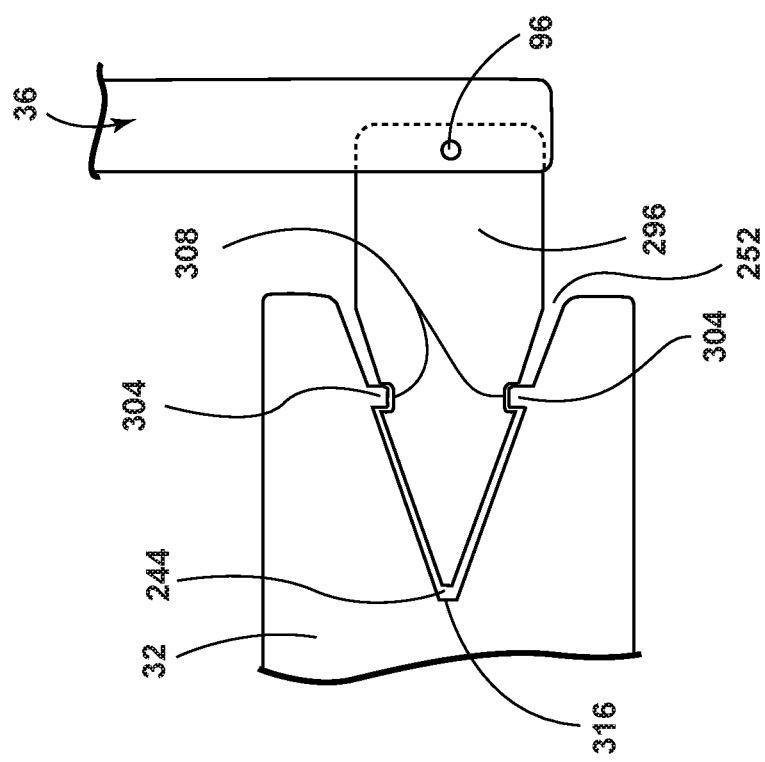

HANDLE-INTEGRATED HANGER

FIELD OF THE DISCLOSURE

The present disclosure generally relates to a handle-integrated hanger. More specifically, the present disclosure relates to a handle-integrated hanger for a vehicle.

BACKGROUND OF THE INVENTION

Vehicles are often provided with mounting surfaces for garment hangers. However, the mounting surfaces that are typically provided tend to be small, are poorly located, and do not allow for the hanging of larger loads of garments. Customers that are dissatisfied with the provided mounting surfaces often purchase aftermarket devices to improve garment storage capacity of the vehicle. However, these aftermarket solutions are often poorly integrated into the vehicle and tend to be difficult to stow when not in use. Accordingly, a need exists for a garment storage solution that is built into the vehicle, relatively low cost, does not require complex or special setup, and is capable of carrying large loads of garments.

SUMMARY OF THE INVENTION

According to a first aspect of the present disclosure, a handle-integrated hanger includes a grab handle, a garment hanger pivotably coupled to the grab handle at a first end of the garment hanger, and a rotational brake that prevents over-rotation of the garment hanger.

Embodiments of the first aspect of the present disclosure can include any one or a combination of the following features:
  the rotational brake further includes a channel in the grab handle and a protrusion on the garment hanger;
  the protrusion has a triangular cross-section;
  the protrusion has a rectangular cross-section;
  the channel further includes an opening and a passage, wherein the opening has a width that is greater than a width of the passage; and
  the channel further includes a sloped region that tapers from a greater width at an exterior end to a smaller width at an interior end.

According to a second aspect of the present disclosure, a handle-integrated hanger includes a grab handle and a garment hanger pivotably coupled to the grab handle at a first end. The garment hanger includes a planar portion and an arcuate portion. The garment hanger pivots in a first plane and a second plane relative to the grab handle.

Embodiments of the second aspect of the present disclosure can include any one or a combination of the following features:
  the handle-integrated hanger further includes a second end of the garment hanger, wherein the second end includes a semi-circular cross-section that engages with the grab handle in a continuous manner when the garment hanger is in a stowed position;
  the garment hanger further includes one or more apertures;
  the garment hanger further includes one or more trenches;
  the garment hanger further includes one or more ridges; and
  the handle-integrated hanger further includes a lock mechanism operably coupled to the garment hanger.

According to a third aspect of the present disclosure, a handle-integrated hanger includes a grab handle and a garment hanger pivotably coupled to the grab handle at a first end. The garment hanger includes a planar portion and an arcuate portion. The garment hanger pivots in a first plane and a second plane relative to the grab handle. The handle-integrated hanger further includes a rotational brake that prevents over-rotation of the garment hanger in at least one of the first plane and the second plane.

Embodiments of the third aspect of the present disclosure can include any one or a combination of the following features:
  the rotational brake further includes a channel in the grab handle and a protrusion on the garment hanger;
  the handle-integrated hanger further includes a second end of the garment hanger, wherein the second end includes a semi-circular cross-section that engages with the grab handle in a continuous manner when the garment hanger is in a stowed position;
  the garment hanger further includes one or more apertures;
  the garment hanger further includes one or more trenches;
  the garment hanger further includes one or more ridges;
  the handle-integrated hanger further includes a lock mechanism operably coupled to the garment hanger; and
  the lock mechanism is spring-loaded These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4B is a front perspective view of the handle-integrated hanger illustrating the garment hanger in a deployed position, according to another embodiment;

FIG. 4C is a side view of the garment hanger, according to a further embodiment;

FIG. 4D is a side view of the garment hanger, according to yet another embodiment;

FIG. 8A is a front perspective view of the handle-integrated hanger, according to another embodiment;

FIG. 8B is a front perspective view of the handle-integrated hanger, according to a further embodiment;

FIG. 14A is a front view of an opening of a channel of the rotational brake, according to one embodiment;

FIG. 14B is a front view of a protrusion of the rotational brake, according to various embodiments;

FIG. 15 is a top view the handle-integrated hanger, illustrating braking regions of the rotational brake, according to one embodiment;

FIG. 16C is an expanded side view of the handle-integrated hanger, taken at region XVIB of FIG. 16A, illustrating the rotational brake, according to an alternative embodiment.

DETAILED DESCRIPTION OF THE PREFERRED EMBODIMENTS

Figure 1:
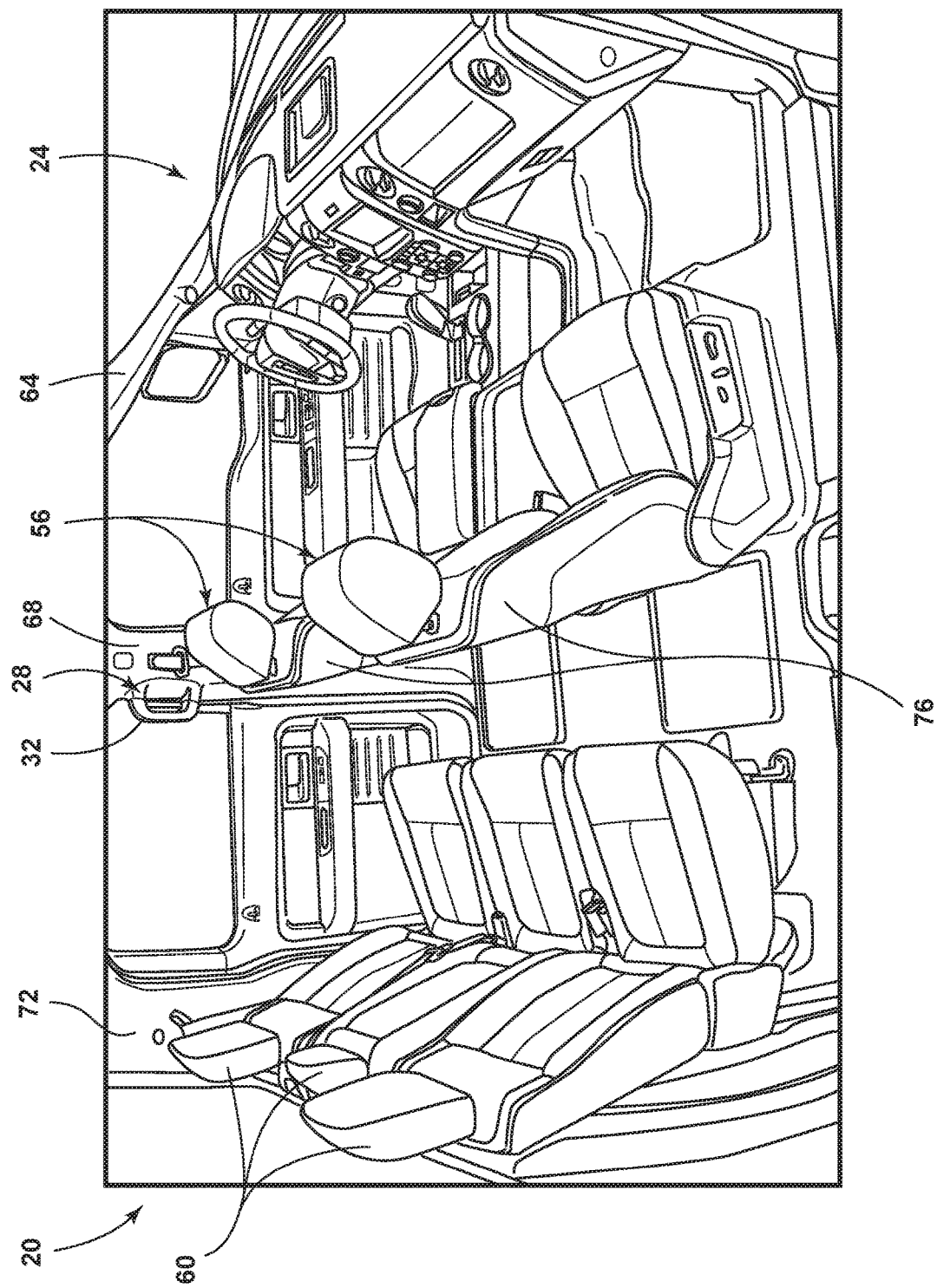
FIG. 1 is a side perspective view of an interior of a vehicle illustrating a grab handle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a handle-integrated hanger. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-16C, reference numeral 20 generally indicates a vehicle. The vehicle 20 includes a cabin 24 or interior of the vehicle 20. A handle-integrated hanger 28 includes a grab handle 32 and a garment hanger 36 pivotably coupled to the grab handle 32 at a first end 40 of the garment hanger 36. The garment hanger 36 includes a planar portion 44 and an arcuate portion 48. The garment hanger 36 may pivot in a first plane and a second plane relative to the grab handle 32. The handle-integrated hanger 28 may further include a rotational brake 52 that prevents over-rotation of the garment hanger 36 in at least one of the first plane and the second plane. The first plane may be an X-Y plane and the second plane may be a Y-Z plane. It is contemplated that the rotational brake 52 of the garment hanger 36 may be further or alternatively positioned to prevent over-rotation in an X-Z plane.

Referring again to FIG. 1, the cabin 24 of the vehicle 20 includes front seats 56 and rear seats 60. The vehicle 20 may further include an A-pillar 64, a B-pillar 68, and a C-pillar 72. While the handle-integrated hanger 28 is shown operably coupled to the B-pillar 68 on a driver side of the vehicle 20, it is contemplated that the handle-integrated hanger 28 may be alternatively positioned within the cabin 24 of the vehicle 20. For example, the handle-integrated hanger 28 may be positioned on the A-pillar 64, the C-pillar 72, a seatback 76 of the front seats 56 or other locations within the cabin 24 that may be suitable for the grab handle 32 and/or the garment hanger 36. Additionally, while a single handle-integrated hanger 28 is depicted it is contemplated that more than one handle-integrated hanger 28 may be positioned within the cabin 24 of the vehicle 20 without departing from the concepts disclosed herein.

Figure 2:
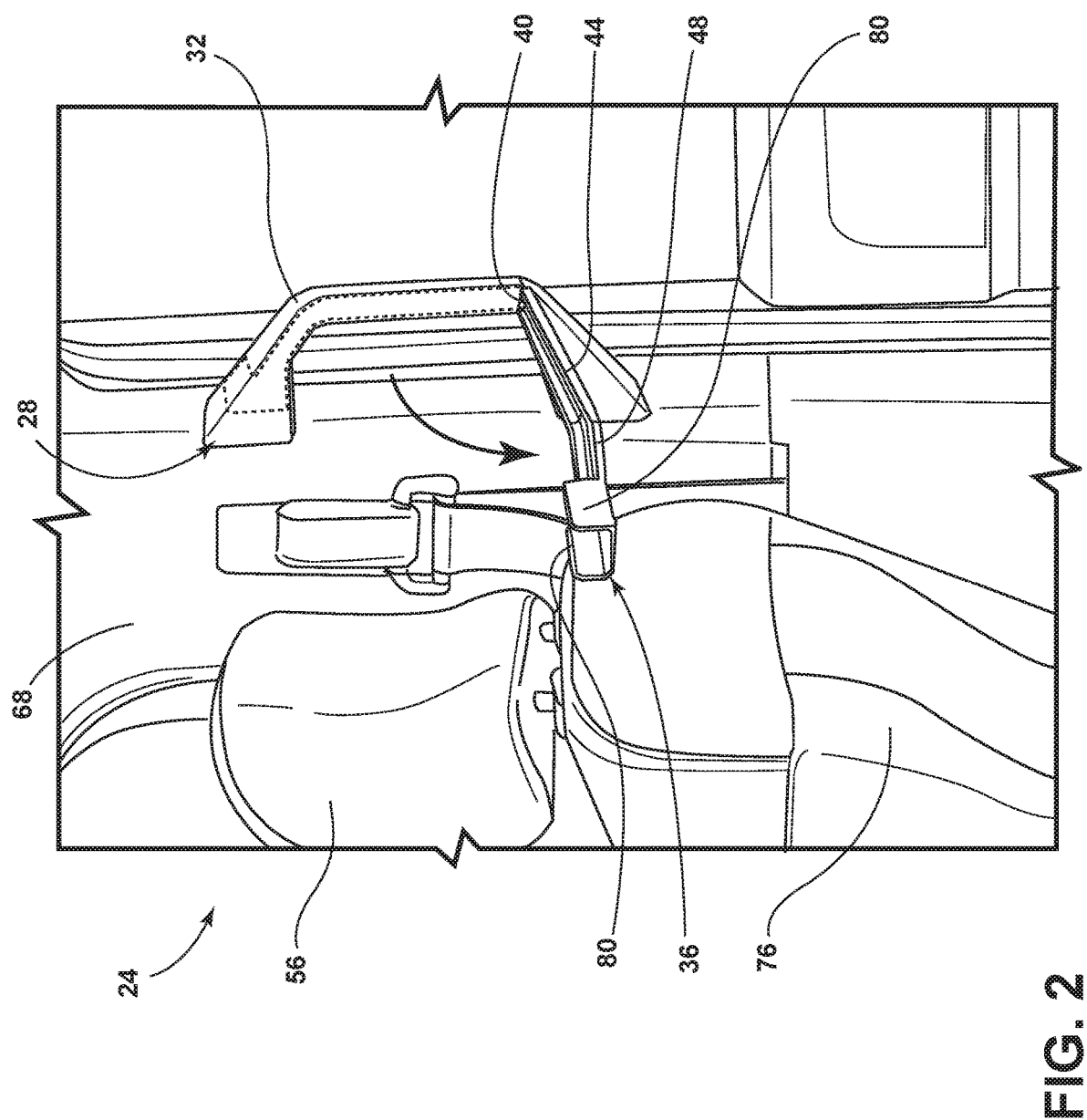
FIG. 2 is a side perspective view of the grab handle illustrating a handle-integrated hanger in a deployed position.

Referring now to FIG. 2, the handle-integrated hanger 28 is shown operably coupled to the B-pillar 68 on a passenger side of the vehicle 20. The grab handle 32 of the handle-integrated hanger 28 is operably coupled to the B-pillar 68. The garment hanger 36 of the handle-integrated hanger 28 is pivotably coupled to the grab handle 32 such that the garment hanger 36 is pivotable between a stowed position and a deployed position. The garment hanger 36, as shown, is in the deployed position and extends vehicle inboard of the B-pillar 68 to occupy an area rearward of the seatback 76 of the front seat 56. The stowed position of the garment hanger 36 is shown in phantom on the grab handle 32. The garment hanger 36 may be pivotable through a plane of rotation that is offset from, or generally perpendicular, to a plane of protrusion of the grab handle 32. In other words, the grab handle 32 protrudes from the B-pillar 68 and the garment hanger 36 may be pivoted off of the grab handle 32 in a direction that is offset from, or generally perpendicular to, the direction in which the grab handle 32 protrudes from the B-pillar 68. The garment hanger 36 includes the planar portion 44 and the arcuate portion 48, according to one embodiment. The garment hanger 36 may further include one or more ridges 80. The ridges 80 may aid in the retention of items that are being stored on the garment hanger 36.

Figure 3B:
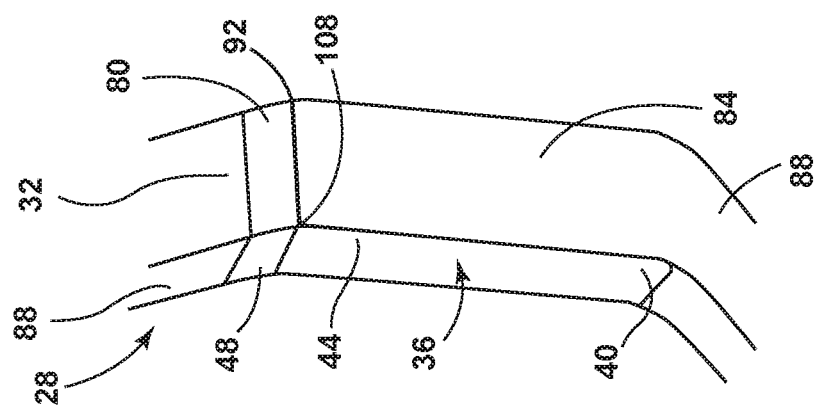
FIG. 3B is a front perspective view of the handle-integrated hanger in the stowed position, according to another embodiment.
Figure 3A:
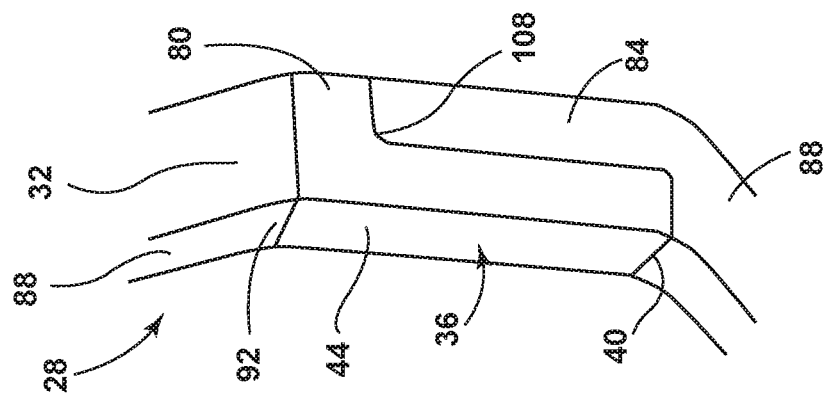
FIG. 3A is front perspective view of the handle-integrated hanger in a stowed position, according to one embodiment.
Figure 3D:
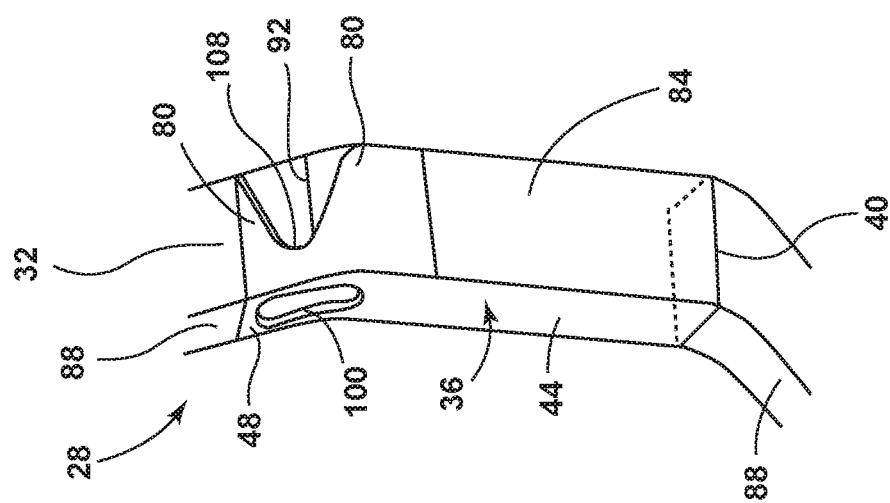
FIG. 3D is a front perspective view of the handle-integrated hanger in the stowed position, according to yet another embodiment.
Figure 3C:
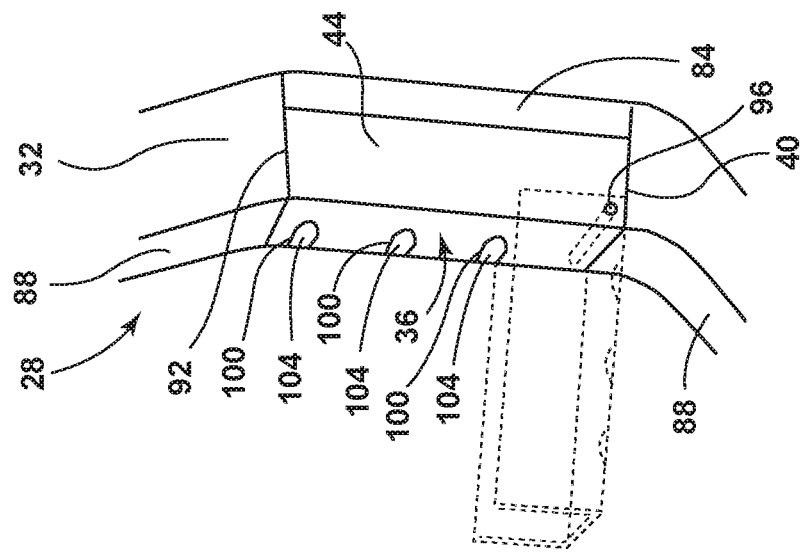
FIG. 3C is a front perspective view of the handle-integrated hanger in the stowed position, according to a further embodiment.
Figure 4A:
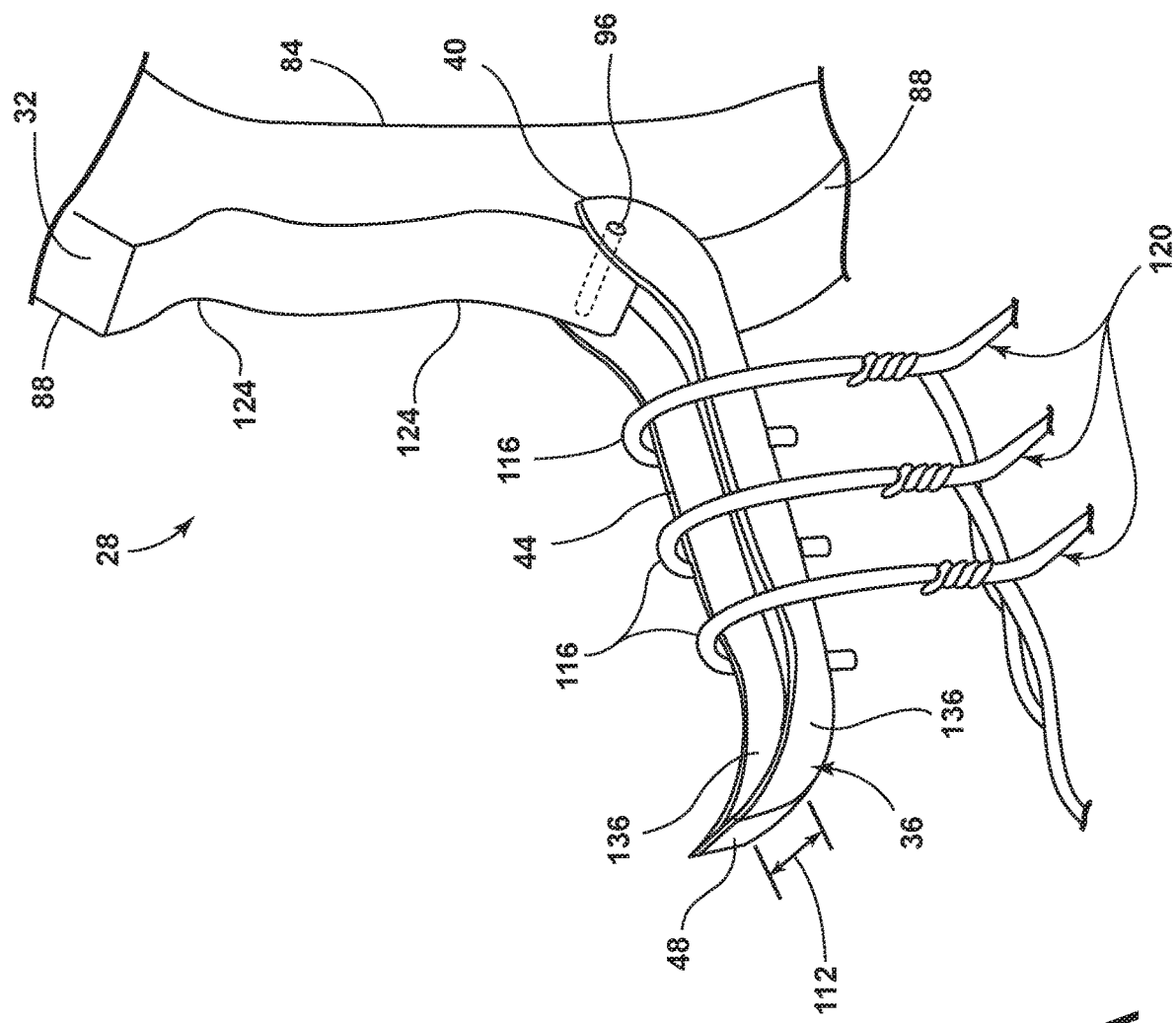
FIG. 4A is a front perspective view of the handle-integrated hanger illustrating a garment hanger in a deployed position, according to one embodiment.

Referring to FIGS. 3A-3D, various embodiments of the handle-integrated hanger 28 are shown with the garment hanger 36 in the stowed position. In general, the garment hanger 36 may be configured to contour to the general shape of the grab handle 32 such that a user is presented with an aesthetically pleasing garment storage solution that is well integrated into the cabin 24 of the vehicle 20 and is easily transitioned between the stowed position and the deployed position. The planar portion 44 of the garment hanger 36 may generally correspond with a vertical section 84 of the grab handle 32. In some embodiments, the arcuate portion 48 of the garment hanger 36 is not employed (FIGS. 3A and 3C). In other embodiments, the arcuate portion 48 of the garment hanger 36 is employed (FIGS. 3B and 3D). In embodiments that employ the arcuate portion 48, the arcuate portion 48 may generally correspond with an angled section 88 of the grab handle 32 (FIG. 3B). In other embodiments, the arcuate portion 48 of the garment hanger 36 may partially correspond with the vertical section 84 and partially correspond with the angled section 88 of the grab handle 32 such that the arcuate portion 48 contours to an inflection point 92 of the grab handle 32 (FIG. 3D).

Referring again to FIGS. 3A-3D, the ridges 80 may be positioned at various locations on the garment hanger 36. For example, the ridges 80 may extend perpendicularly from the planar portion 44 of the garment hanger 36, extend perpendicularly from the arcuate portion 48 of the garment hanger 36, be integrally formed with the planar portion 44 of the garment hanger 36, be integrally formed with the arcuate portion 48 of the garment hanger 36, or combinations thereof. As depicted in the embodiment shown in FIG. 3C, the garment hanger 36 may be operably coupled to the grab handle 32 by a pin 96. The pin 96 may provide a pivot point or fixed rotational axis about which the garment hanger 36 pivots as the garment hanger 36 is transitioned between the stowed position and the deployed position. The deployed position of the embodiment shown in FIG. 3C is depicted in phantom. The garment hanger 36 may further include one or more apertures 100. The apertures 100 may be used to aid in the retention of items stored on the garment hanger 36. For example, the apertures 100 may be used to allow at least a portion of a hooked end of a coat hanger to pass through one of the apertures 100 such that the coat hanger is retained on the garment hanger 36 during vehicle maneuvers. The apertures 100 may additionally be used in combination with corresponding tabs 104 on the grab handle 32 to aid in securing the garment hanger 36 in the stowed position when not in use. The apertures 100 and the tabs 104 may engage in a snap-fit manner or in an interference fit manner. For example, the tabs 104 may have a circumference that is slightly greater than the circumference of the apertures 100 such that engagement between the tabs 104 and the apertures 100 while the garment hanger 36 is in the stowed position applies a radial pressure in an outward direction between the tabs 104 and the apertures 100.

Referring further to FIGS. 3A-3D, the garment hanger 36 may further include one or more trenches 108. The trenches 108 may be alternatively referred to as valleys between two ridges 80. It is contemplated that the trenches 108 may exist independent of the ridges 80. In other words, it is contemplated that some embodiments may employ ridges 80 without employing trenches 108 while other embodiments may employ trenches 108 without employing ridges 80. The trenches 108 may be used to aid in the retention of items that are stored on the garment hanger 36. The trenches 108 may be positioned on the garment hanger 36 to correspond with one or more of the apertures 100 to further increase the ability of the garment hanger 36 to retain items that are stored on the garment hanger 36. Similar to the relationship between the trenches 108 and the ridges 80, the trenches 108 and the apertures 100 may be employed independent of one another or may be employed such that the trenches 108 and the apertures 100 are associated with one another in their positioning on the garment hanger 36. In some embodiments, the ridges 80, the apertures 100, and the trenches 108 may be associated with one another in their positioning on the garment hanger 36.

Referring now to FIGS. 4A-4D, additional embodiments of the garment hanger 36 are shown. The shape and/or contour of the garment hanger 36 may take various forms. For example, a width 112 of the garment hanger 36 may be less than or equal to a hook opening of a hook portion 116 of a coat hanger 120 such that the hook portion 116 engages with the garment hanger 36 to store the coat hangers 120. The arcuate portion 48 of the garment hanger 36 may aid in the retention of the coat hangers 120 during vehicle maneuvers (e.g., turning or cornering). The grab handle 32 of the handle-integrated hanger 28 may include one or more recesses 124 that may remain accessible while the garment hanger 36 is in the stowed position. Accordingly, while the garment hanger 36 is in the stowed position, the recesses 124 remain accessible to a user and may receive the hook portion 116 of the coat hanger 120. In such an embodiment, the garment hanger 36 provides additional retention to the coat hanger 120 by sandwiching the coat hanger 120 between the recesses 124 of the grab handle 32 and the garment hanger 36. The handle-integrated hanger 28 may further include a lock mechanism 128 (FIGS. 7A and 7B) that retains the garment hanger 36 in the stowed position. The lock mechanism 128 may be spring-loaded.

Referring again to FIGS. 4A-4D, the hook portion 116 of the coat hanger 120 may be retained by the ridges 80, the apertures 100, and/or the trenches 108. The ridges 80, the apertures 100, and the trenches 108 may be positioned at various locations on the garment hanger 36 without departing from the concepts disclosed herein. For example, an end 132 of the garment hanger 36 may include one or more of the ridges 80, one or more of the apertures 100, and/or one or more of the trenches 108. The ridges 80 may be employed without employing the trenches 108. In such an embodiment, the ridges 80 may be walls 136 of the garment hanger 36. A trough 140 may exist between the walls 136 of the garment hanger 36. The trough 140 may receive a terminal end 144 of the hook portion 116 of the coat hanger 120. The trough 140 may be defined by the walls 136 and a bottom surface 148 of the garment hanger 36.

Figure 5A:
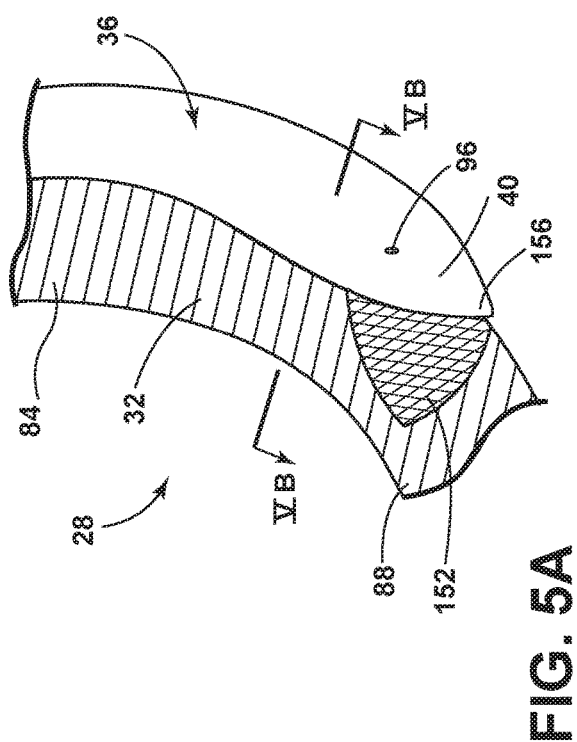
FIG. 5A is a rear perspective view of the handle-integrated hanger illustrating a fit and finish of a heel of the garment hanger, according to one embodiment.
Figure 5B:
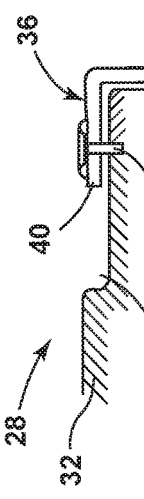
FIG. 5B is a cross-sectional view of the fit and finish of the heel of the garment hanger, taken along line VB-VB of FIG. 5A.
Figure 5C:
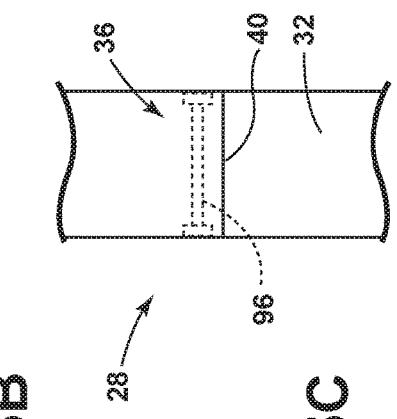
FIG. 5C is a front view of the handle-integrated hanger illustrating the fit and finish of the handle-integrated hanger, according to one embodiment.

Referring to FIGS. 5A-5C, in some embodiments the garment hanger 36 may be flush with the grab handle 32. The flush appearance of the handle-integrated hanger 28 may provide a more integrated appearance and may be more aesthetically pleasing to the end user. The garment hanger 36 may be operably coupled to the grab handle 32 by the pin 96. The grab handle 32 may include a countersink 152 that allows a heel 156 of the garment hanger 36 to pass over the grab handle 32 as the garment hanger 36 is transitioned between the stowed position and the deployed position. The heel 156 of the garment hanger 36 may include a notch, similar to the trenches 108, that allows the garment hanger 36 to transition between the stowed position and the deployed position without encountering physical interference between the heel 156 and the grab handle 32. Accordingly, the heel 156 of the garment hanger 36 may be free of direct engagement with the grab handle 32 as the garment hanger 36 is transitioned between the stowed position and the deployed position. The countersink 152 on the grab handle 32 has a convex shape that prevents the countersink 152 region of the grab handle 32 from impeding rotation of the garment hanger 36. However, the area of the grab handle 32 that is not located within the countersink 152 region may interfere with the rotation of the garment hanger 36 such that over rotation of the garment hanger 36 is prevented by a physical interference or contact between the grab handle 32 and the garment hanger 36. As shown in FIG. 5C, the user may be presented with a flush appearance of the engagement between the grab handle 32 and the garment hanger 36 of the handle-integrated hanger 28.

Figure 6A:
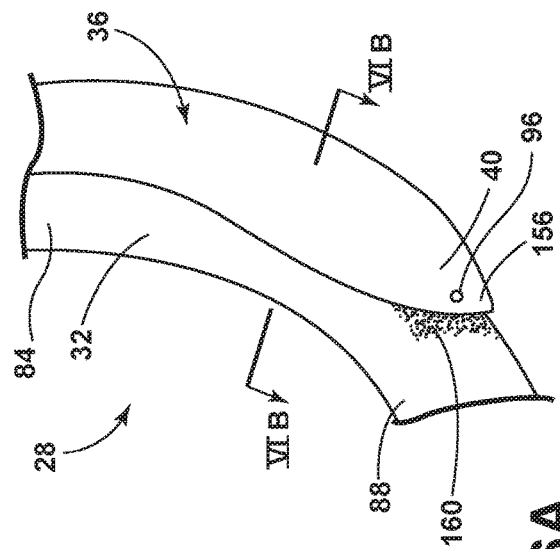
FIG. 6A is a rear perspective view of the handle-integrated hanger illustrating a fit and finish of the heel of the garment hanger, according to another embodiment.
Figure 6B:
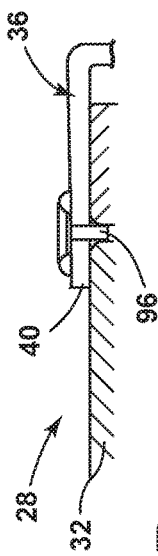
FIG. 6B is a cross-sectional view of the fit and finish of the heel of the garment hanger, taken along line VIB-VIB of FIG. 6A.
Figure 6C:
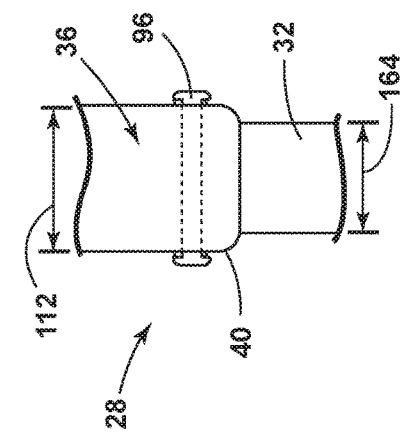
FIG. 6C is a front view of the handle-integrated hanger illustrating the fit and finish of the handle-integrated hanger, according to another embodiment.

Referring to FIGS. 6A-6C, in some embodiments the handle-integrated hanger 28 may have an over-flush appearance where the garment hanger 36 is offset from the grab handle 32. The pin 96 retains the garment hanger 36 to the grab handle 32 and serves as a pivot point for the deployment of the garment hanger 36. In the embodiment shown the garment hanger 36 may be preferably positioned on the grab handle 32 proximal a lower bend 160 in the grab handle 32. By positioning the garment hanger 36 proximal of the lower bend 160 of the grab handle 32, the garment hanger 36 may be deployed from the stowed position to the deployed position without experiencing physical contact or physical impedance between the grab handle 32 and the heel 156 of the garment hanger 36. Similar to the embodiment depicted in FIGS. 5A-5C, the embodiment shown here may prevent over rotation of the garment hanger 36 in the deployed position by impairing further rotation of the garment hanger 36 beyond an intended use position via physical contact and/or physical impairment of movement between the grab handle 32 and the heel 156 of the garment hanger 36 once the garment hanger 36 has reached the intended use position. As can be seen in FIG. 6C, the width 112 of the garment hanger 36 is greater than a width 164 of the grab handle 32.

Figure 7B:
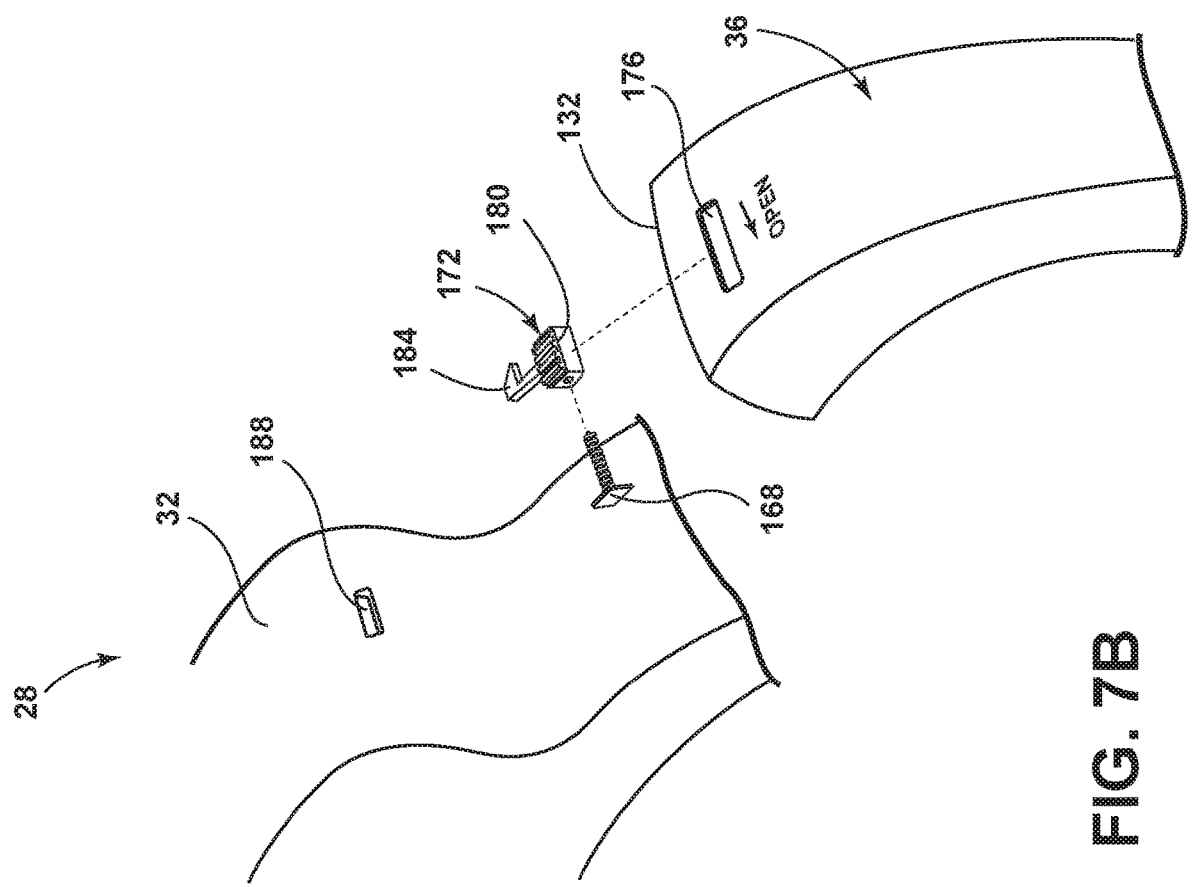
FIG. 7B is a top perspective view of the coupling between the upper portion of the garment hanger and the upper portion of the grab handle illustrating the lock mechanism in an exploded view, according to one embodiment.
Figure 7A:
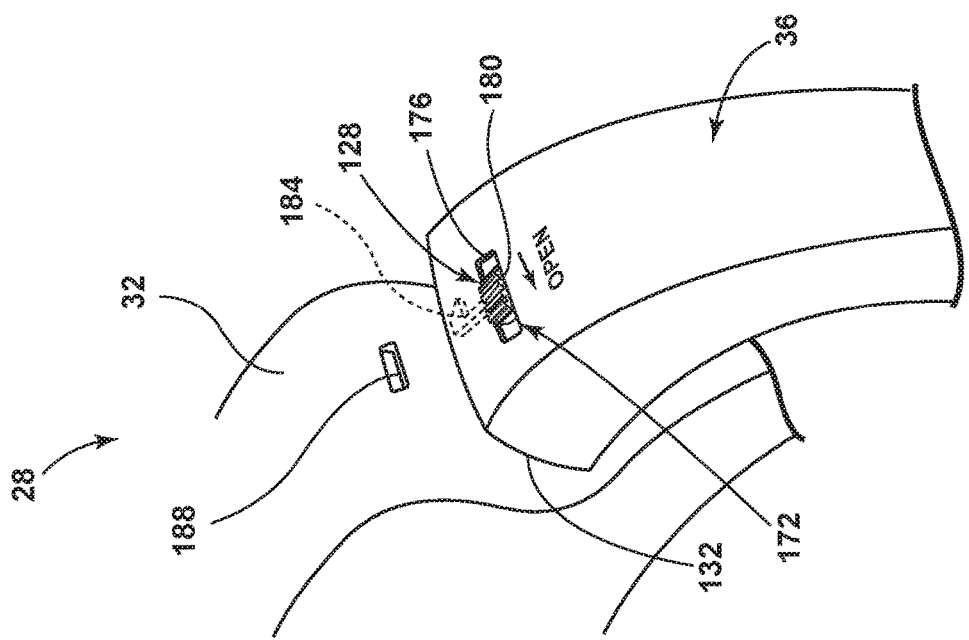
FIG. 7A is a top perspective view of a coupling between an upper portion of the garment hanger and an upper portion of the grab handle illustrating a lock mechanism, according to one embodiment.

Referring to FIGS. 7A-7B, the lock mechanism 128 of the handle-integrated hanger 28 is shown, according to one embodiment. The lock mechanism 128 may be primarily housed within the garment hanger 36. The lock mechanism 128 may be positioned proximal the end 132 of the garment hanger 36 that is not pivotably coupled to the grab handle 32. The lock mechanism 128 may include a biasing member 168, an engagement member 172, and a window 176. The window 176 may be located in the garment hanger 36. The biasing member 168 is positioned between the engagement member 172 and an interior surface of the garment hanger 36. When the lock mechanism 128 is fully assembled, the engagement member 172 partially protrudes through the window 176 and the biasing member 168 biases the engagement member 172 to a locked position. The engagement member 172 may further include an actuation portion 180 and an arm portion 184. The actuation portion 180 may be used by a user to actuate the lock mechanism 128 from the locked position to an unlocked position by actuating the engagement member 172 in a direction that opposes the biasing force applied by the biasing member 168.

Referring again to FIGS. 7A and 7B, the arm portion 184 of the engagement member 172 may at least partially protrude from the end 132 of the garment hanger 36 for engagement with a receiving portion 188 of the lock mechanism 128. In some embodiments, the arm portion 184 of the engagement member 172 may at least partially protrude from the end 132 of the garment hanger 36 for engagement with the receiving portion 188 without extending beyond an upper extreme of the garment hanger 36. In other words, the end 132 of the garment hanger 36 may be provided with an overhang that substantially hides the arm portion 184 of the lock mechanism 128 from view of the user. The receiving portion 188 of the lock mechanism 128 may be positioned in the grab handle 32. While the lock mechanism 128 has been described as depicted in FIGS. 7A and 7B, it is contemplated that the lock mechanism 128 may be alternatively positioned and/or configured without departing from the concepts disclosed herein. For example, the lock mechanism 128 may be primarily housed within the grab handle 32 and the receiving portion 188 may be housed within the garment hanger 36. In another alternative, it is contemplated that the lock mechanism 128 may be positioned proximal the heel 156 of the garment hanger 36 with the lock mechanism 128 primarily housed within either the grab handle 32 or the garment hanger 36.

Referring now to FIG. 8A, an alternative embodiment of the handle-integrated hanger 28 is depicted and may be referred to as a loop-latch linkage 192. The loop-latch linkage 192 includes a hook 196 operably coupled to a support structure 200, a latch portion 204, and a handle portion 208. The latch portion 204 further includes a plurality of latch supports 212, a latch 216, and a latch pin 220 that operably couples the latch 216 to the latch supports 212. The latch pin 220 permits pivotable motion of the latch 216 relative to the latch supports 212. The latch supports 212 may be operably coupled to the support structure 200. The handle portion 208 further includes a first loop 224 and a second loop 228. The first loop 224 and/or the second loop 228 may be extendable between a recessed position (shown in phantom) and the extended position depicted. The first loop 224 and the second loop 228 are operably coupled to a housing 232 of the handle portion 208. The embodiment depicted provides the handle portion 208 as pivotably coupled to the latch 216 in a permanent manner. The support structure 200 may be the A-pillar 64, the B-pillar 68, the C-pillar 72, the seatback 76 of the front seat 56 (FIG. 1), or other areas within the cabin 24 of the vehicle 20 where the handle-integrated hanger 28 may be desirable. The latch pin 220 permits pivotable motion of the latch 216 relative to the latch supports 212.

Referring to FIG. 8B, the embodiment depicted provides the handle portion 208 as a removable portion of the handle-integrated hanger 28. According to some embodiments the handle portion 208 is configured to enclose or "sandwich" coat hangers 120 between a surface of the handle portion 208 and the support structure 200 to which the handle portion 208 is operably coupled. In so doing, a compressive force is applied to the coat hangers 120 that retains the coat hangers 120 in the handle-integrated hanger 28. The removability of the handle portion 208 may be at least partially enabled by the latch 216 including a lip 234 to which the second loop 228 may be removably coupled. Installation of the handle portion 208 onto the hook 196 and the latch portion 204 may be accomplished by first sliding the first loop 224 over the hook 196, then engaging the latch 216 with the second loop 228, and finally applying a downward pressure to the latch 216 such that the latch 216 assumes an engaged and locked position. Alternatively, the handle portion 208 may be operably coupled to the hook 196 and the latch portion 204 by first engaging the latch 216 with the second loop 228, then sliding the first loop 224 over the hook 196, and finally applying a downward pressure to the latch 216 such that the latch 216 assumes the engaged and locked position. It is contemplated that while a compressive force is applied to the coat hangers 120 by the handle portion 208 being in the engaged and locked position it may be beneficial to provide the handle portion 208 with a degree of compliance or "give." The compliance provided to the handle portion 208 may be achieved by manufacturing the handle portion 208 and/or the housing 232 from a material that provides the compliance. For example, the material that provides the compliance may be a resilient polymeric material (e.g., thermoplastics, thermosets, etc.), a metal that is sufficiently thin so as to be temporarily and reversibly deformed by the closure of the handle-integrated hanger 28 having coat hangers 120 coupled thereto, and the like. Additionally or alternatively, the handle portion 208 may include a first portion and a second portion that are operably coupled by a resilient member (e.g., spring, elastic material, etc.) that permits insertion and retention of the coat hangers 120 between the handle portion 208 and the support structure 200 when the handle portion 208 is in the engaged and locked position. It is further contemplated that the handle portion 208 may include the first portion and the second portion as directly coupled to the support structure 200 at a first end of each of the first portion and the second portion while a second end of the first portion and the second portion are equipped with clip or latch system that operates in a similar manner to that of the loop-latch linkage 192. In some embodiments the handle portion 208 may serve as the grab handle 32 when in the engaged and locked position and the hook 196 may serve as the garment hanger 36 when the handle portion 208 is not in the engaged and locked position. In some embodiments, where the handle portion 208 is entirely removable from the hook 196 and the latch portion 204, the handle portion 208 may be used to transport garments that are on the coat hangers 120 to areas external to the vehicle 20 (e.g., into a store, home, or other location), for example by attaching a carrier handle to the first loop 224 and the second loop 228 and supporting the hook portions 116 of the coat hangers 120 on the handle portion 208.

Figure 9B:
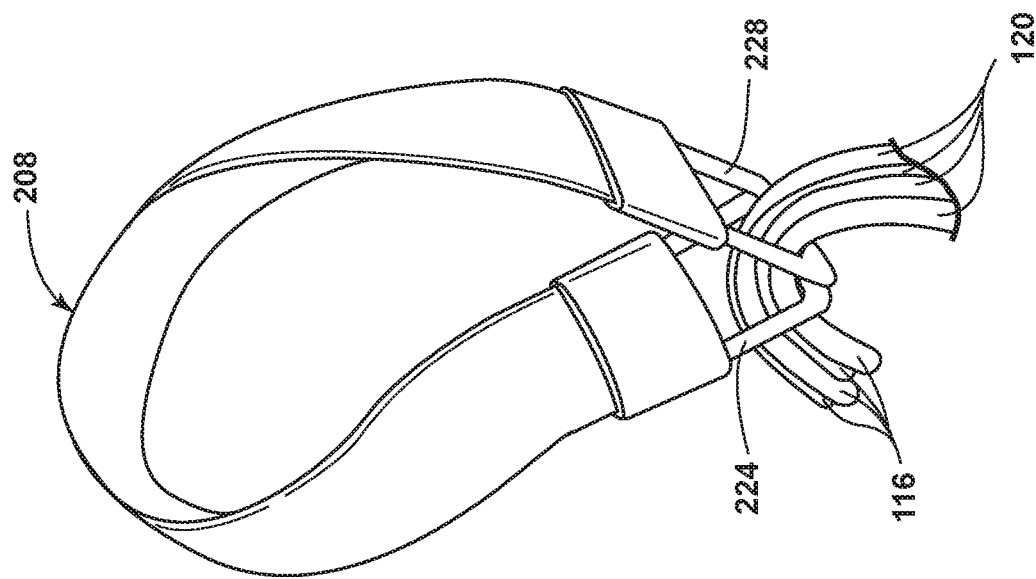
FIG. 9B is a front perspective view of the handle portion of the handle-integrated hanger, according to a further embodiment.
Figure 9A:
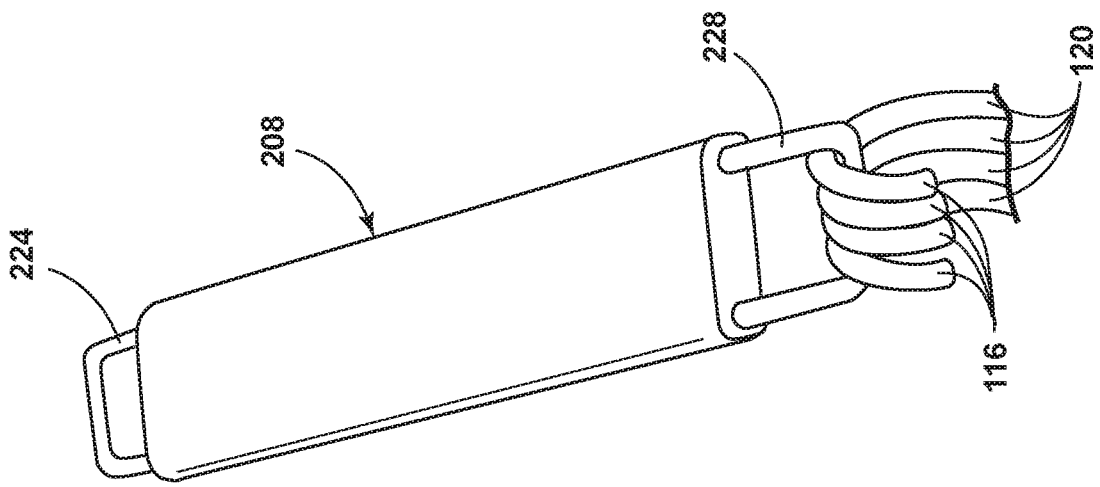
FIG. 9A is a front perspective view of a handle portion of the handle-integrated hanger, according to one embodiment.

Referring now to FIGS. 9A and 9B, the handle portion 208 is shown in various embodiments that may be utilized to transport garments that are on the coat hangers 120 to areas external to the vehicle 20 (FIG. 1). For example, the embodiment depicted in FIG. 9A may be utilized by first removing the handle portion 208 from the support structure 200 (FIG. 8B). Next, the hook portion 116 of the coat hanger 120 is inserted through either the first loop 224 or the second loop 228. Finally, the handle portion 208 having the coat hangers 120 supported by either the first or second loop 224, 228 can be carried to areas that are external to the vehicle 20 without the discomfort that users may associate with carrying multiple garments directly on one's hand (FIG. 9A). An alternative approach to transporting the garments is to support the coat hangers 120 as described for FIG. 9A but instead of inserting the hook portion 116 of the coat hanger 120 through only one of the first and second loops 224, 228, the hook portion 116 is inserted through both the first loop and the second loop 224, 228 as shown in FIG. 9B. Accordingly, the handle portion 208 becomes a convenient and comfortable carrying handle that distributes the weight of the garments that are supported by the coat hangers 120.

Figure 10A:
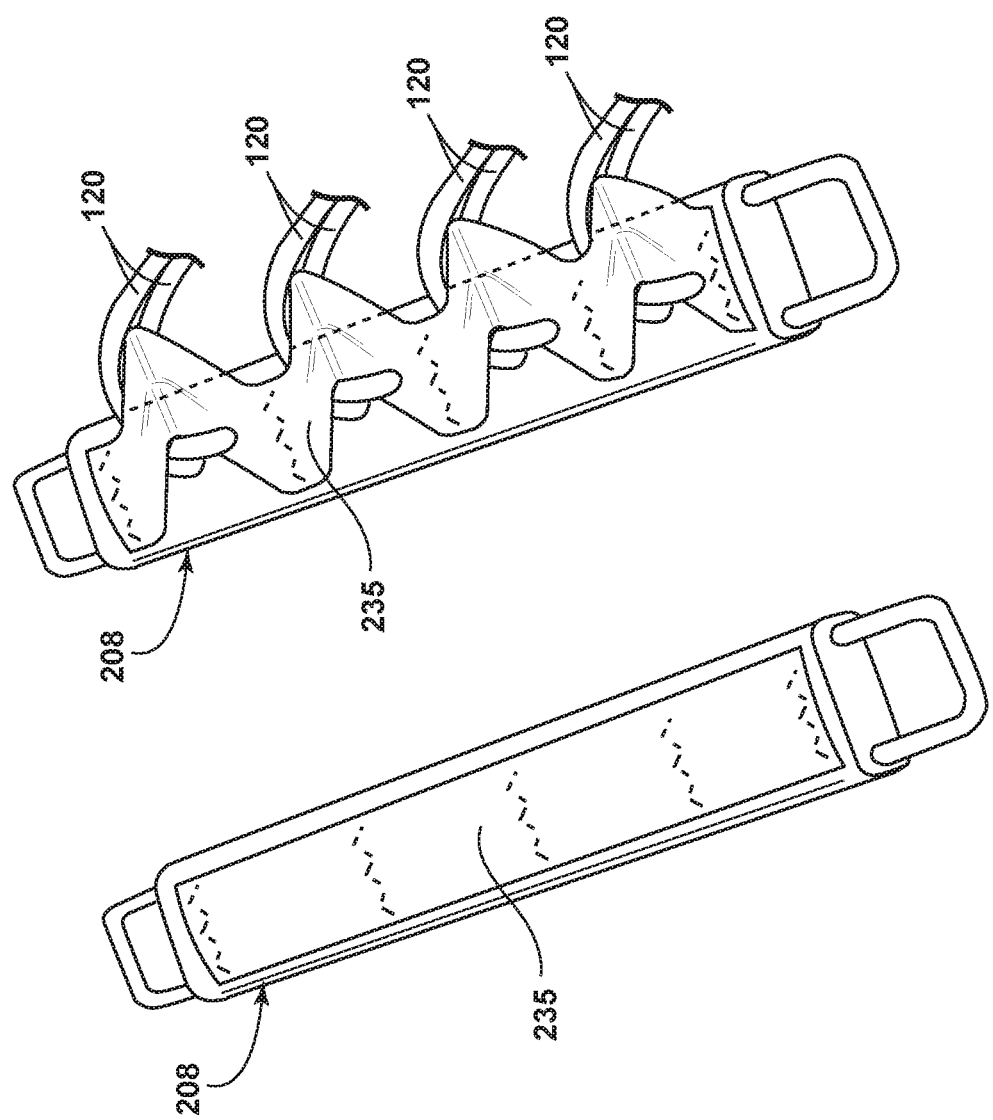
FIG. 10A is a front perspective view of the handle portion of the handle-integrated hanger, according to another embodiment.

Referring to FIG. 10A, the handle portion 208 is shown according to one embodiment. The embodiment shown is depicted with coat hangers 120 stored thereon (right side of FIG. 10A) and without coat hangers 120 stored thereon (left side of FIG. 10A). The handle portion 208 may be made of a rigid material that does not easily deform. In such embodiments, coat hangers 120 are not "sandwiched" between the handle portion 208 and the support structure 200 as described for some embodiments above. Rather, the handle portion 208 is provided with a flexible strap 235 that is coupled to the handle portion 208. The flexible strap 235 may be made from a resilient material such that the flexible strap 235 generally abuts a surface of the handle portion 208 when coat hangers 120 are not inserted between the handle portion 208 and the flexible strap 235. In such an embodiment the resilient material of the flexible strap 235 may provide a compressive force to the coat hangers 120 when the coat hangers 120 are inserted between the handle portion 208 and the flexible strap 235 such that the coat hangers 120 are retained on the handle portion 208. In some embodiments, the flexible strap 235 may be coupled to the handle portion 208 in a segmented way such that a plurality of retention regions exist for the coat hangers 120.

Figure 10B:
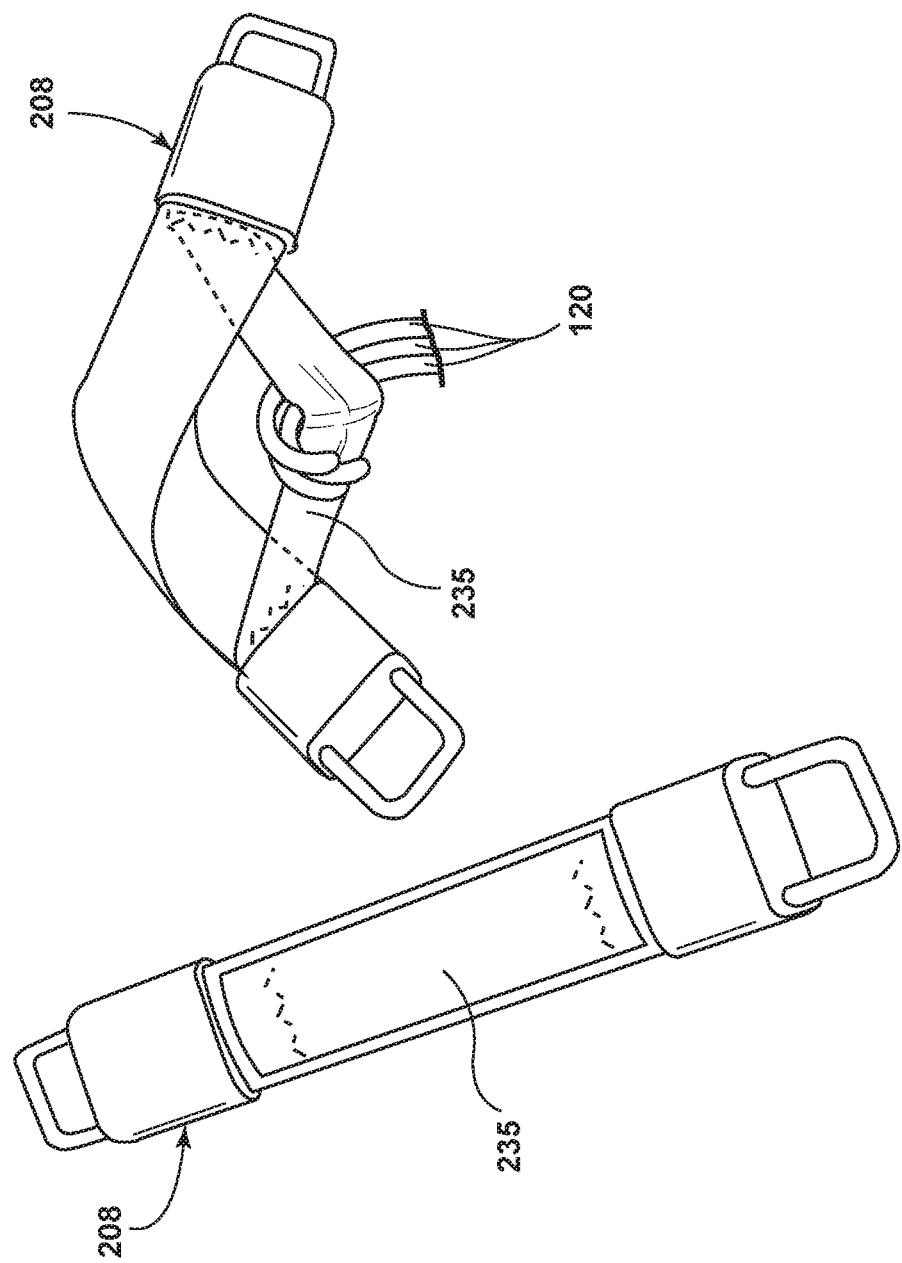
FIG. 10B is a front perspective view of the handle portion of the handle-integrated hanger, according to one embodiment.

Referring now to FIG. 10B, the handle portion 208 may be made a flexible material that can be deformed. In such an embodiment the flexible strap 235 may be coupled to the handle portion 208 such that a single retention region exists for the coat hangers 120. In the depicted embodiment, the coat hangers 120 are inserted between the handle portion 208 and the flexible strap 235. Then, the weight of the coat hangers 120 and/or the garments that are supported on the coat hangers 120 pull the flexible strap 235 away from the handle portion 208 such that the handle portion 208 begins to deform or "bow." The separation of the flexible strap 235 from the handle portion 208 creates a natural carrying region of the handle portion 208 for a user to grasp and carry the handle portion 208 and the associated coat hangers 120 to areas external to the vehicle 20. Similar to the embodiment described above, the flexible strap 235 may be made from a resilient material such that the flexible strap 235 generally abuts the handle portion 208 when coat hangers 120 are not inserted between the handle portion 208 and the flexible strap 235.

Figure 11:
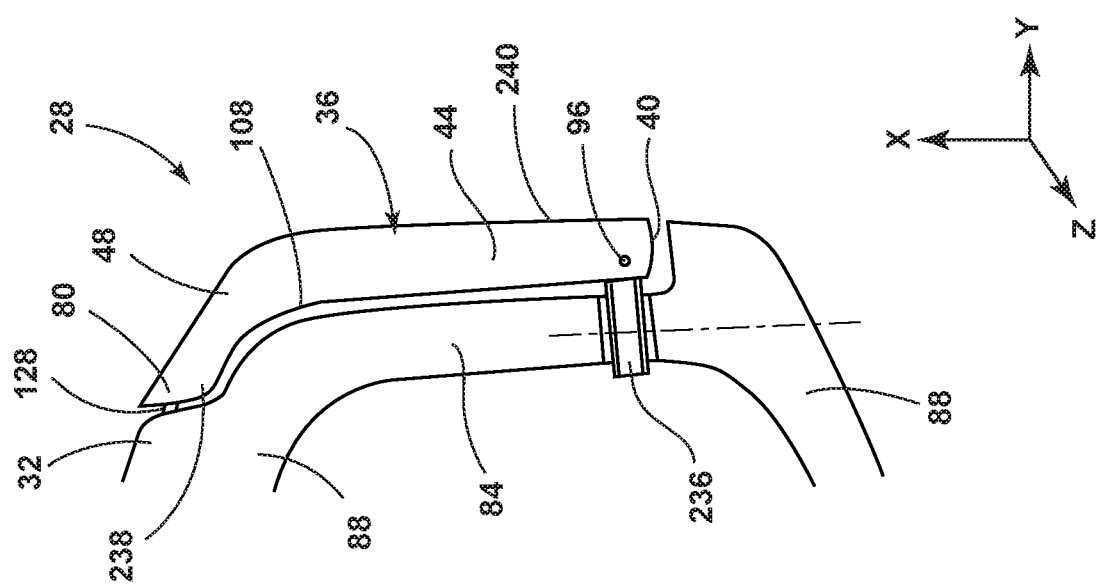
FIG. 11 is a side view of the handle-integrated hanger, according to a further embodiment.

Referring to FIG. 11, the handle-integrated hanger 28, as shown, is capable of pivotable or rotational motion in a first plane and a second plane relative to the grab handle 32. The rotational motion of the garment hanger 36 relative to the grab handle 32 in the first plane may be similar to the pivotable motion described above for various other embodiments of the handle-integrated hanger 28. Accordingly, the first plane of rotation or pivotable motion may be in a downward direction and may be defined by the deployment of the garment hanger 36 from the stowed position to the deployed position. For example, the first plane of rotation may be in an X-Y plane. The second plane of rotation or pivotable movement of the garment hanger 36 relative to the grab handle 32 may be in a side-to-side direction relative to the grab handle 32. For example, the second plane of rotation may be in an X-Z plane. The side-to-side motion of the garment hanger 36 relative to the grab handle 32 may be accomplished by a hinge 236 that operably couples the garment hanger 36 to the grab handle 32. The hinge 236 is preferably positioned on the vertical section 84 of the grab handle 32 rather than the angled sections 88 of the grab handle 32. However, it is contemplated that the hinge 236 may be positioned on the angled sections 88 of the grab handle 32.

Referring again to FIG. 11, the handle-integrated hanger 28 may be equipped with the lock mechanism 128. While the garment hanger 36 is shown as spaced a distance away from the grab handle 32, it is contemplated that the garment hanger 36 may have a semi-circular cross-section, for example at least at a second end 238 of the garment hanger 36, that engages with the grab handle 32 in a continuous manner when the garment hanger 36 is in the stowed position. The semi-circular cross-section of the garment hanger 36 allows for a more integrated appearance of the handle-integrated hanger 28 that may be more aesthetically pleasing to the end user. In such an embodiment, it may be beneficial to position the pin 96 proximate an outer region 240 of the garment hanger 36 to prevent physical contact between the garment hanger 36 and the grab handle 32 that may impede deployment of the garment hanger 36 from the stowed position to the deployed position. Pivotable motion of the garment hanger 36 relative to the grab handle 32 through the first plane and the second plane allows for a more customizable positioning by the end user such that items stored on the garment hanger 36 do not create additional blind spots for a driver of the vehicle 20. Additionally, garments stored on the garment hanger 36 may better avoid contact with components of the interior of the vehicle 20, thereby reducing wrinkling and/or damage to the garments. Further, the handle-integrated hanger 28 of the present disclosure enables greater storage capacity on the garment hanger 36 than may be otherwise available.

Figure 13:
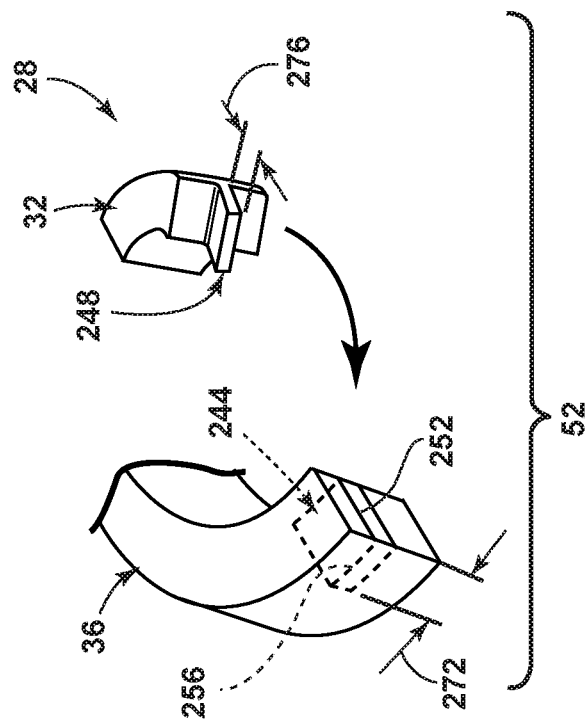
FIG. 13 is a bottom perspective view of the handle-integrated hanger illustrating the rotational brake, according to another embodiment.
Figure 12:
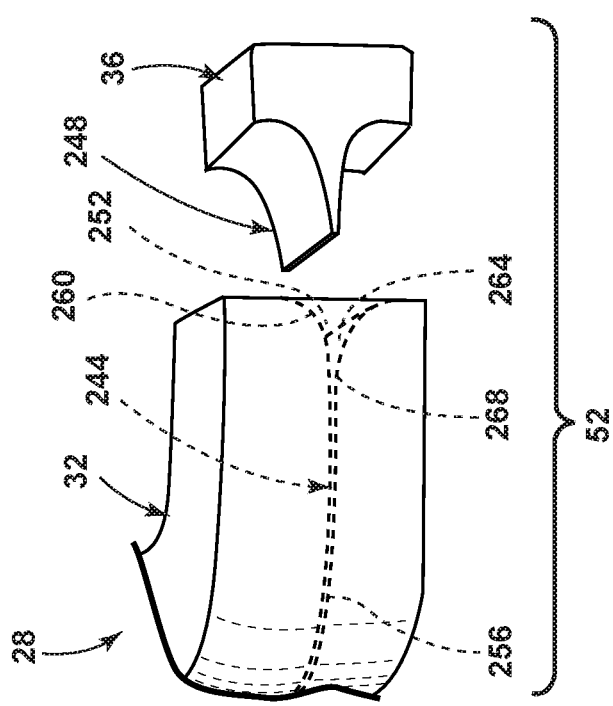
FIG. 12 is a bottom perspective view of the handle-integrated hanger illustrating a rotational brake, according to one embodiment.

Referring now to FIGS. 12 and 13, the various embodiments of the handle-integrated hanger 28 described above may further include the rotational brake 52. In one embodiment, the rotational brake 52 may include a channel 244 in the grab handle 32 and a protrusion 248 on the garment hanger 36. The protrusion 248 may have a generally triangular cross-section, a generally rectangular cross-section, or any other geometric cross-section that is designed to engage with the channel 244. The channel 244 may further include an opening 252 and a passage 256. The opening 252 may have a width that is greater than a width of the passage 256. The channel 244 may further include a sloped region 260 that tapers from a greater width from an exterior end 264 to a smaller width at an interior end 268. The rotational brake 52 may provide frictional force that resists over-rotation of the garment hanger 36 while allowing some compliance or "give" that prevents the handle-integrated hanger 28 from breaking in the event of over-rotation. Additionally, the rotational brake 52 may decrease the severity of an injury incurred by a vehicle occupant in the event of a vehicle impact while the garment hanger 36 is in the deployed position. More specifically, in the event of over-rotation of the garment hanger 36 relative to the grab handle 32, such as during a vehicle impact, as a result of an excessive load being applied to the garment hanger 36, or the garment hanger 36 being used by a vehicle occupant as an entry/exit aid, the protrusion 248 enters the channel 244 and frictional resistance to the over-rotation is provided by the fit between the channel 244 and the protrusion 248. Said another way, the protrusion 248 may be generally wedge shaped, regardless of the cross-sectional geometry, and as the protrusion 248 enters the channel 244 during an over-rotation event the shape of the protrusion 248 may provide an ever increasing frictional resistance to the over-rotation while also providing at least some impact compliance or give to lessen the potential of an injury to the vehicle occupant. The shape and/or slope of the generally wedge shaped protrusion 248 may be tuned to provide various levels of compliance or give to suit various applications and/or requirements. In some embodiments the channel 244 may have a depth 272 that is less than a length 276 of the protrusion 248 such that an over-rotation event results in the deformation of the protrusion 248 as it reaches the end of the channel 244 thereby providing at least some impact compliance or give. While specific embodiments of the rotational brake 52 are shown and discussed, it is contemplated that various aspects of the embodiments may be combined, modified, and/or added to without departing from the concepts disclosed herein. Additionally, it is contemplated that the channel 244 and the protrusion 248 of the rotational brake 52 may be alternatively positioned such that the garment hanger 36 is equipped with the channel 244 and the grab handle 32 is equipped with the protrusion 248. In various embodiments, when the garment hanger 36 and the grab handle 32 are referred to as being equipped with the channel 244 and/or the protrusion 248, it is contemplated that the channel 244 and/or the protrusion 248 may be formed in a separate component that primarily couples to the garment hanger 36 and/or the grab handle 32 (e.g., a circular bearing coupled to the grab handle 32). Further, the rotational brake 52 may be utilized in various axes of rotation without departing from the concepts disclosed herein. Still further, more than one rotational brake 52 may be utilized at a time in the same or alternate axes of rotation.

Referring to FIG. 14A, the opening 252 of the channel 244 in the rotational brake 52 is shown according to one embodiment. The opening 252 may include a central region 280 that is flanked on either side by distal regions 284. The distal regions 284 may be contoured (e.g., tapered) to provide ever increasing frictional resistance to over-rotation while also providing at least some impact compliance or give to lessen the potential of an injury to the vehicle occupant during an impact event. The depicted contours of the distal regions 284 may be utilized in addition to or as an alternative for the rotational brakes 52 shown in FIGS. 12 and 13. In some embodiments, the rotational brakes 52 shown in FIGS. 12 and 13 may be utilized to provide impact compliance in a first plane of rotation while the distal ends 284 shown may provide impact compliance in a second plane of rotation. Additionally, the protrusion 248 (FIGS. 12 and 13) may be contoured in a manner that is complementary to the opening 252 depicted in FIG. 14A. In other words, the protrusion 248 may be contoured along more than one axis (e.g., along the first and second planes of rotation). The first and second planes of rotation may be perpendicular to one another.

Referring now to FIG. 14B, the protrusion 248 of the rotational brake 52 is shown according to various embodiments. The protrusion 248 may include a middle portion 288 that is flanked on either side by outer portions 292. The middle portion 288 interacts with the central region 280 (FIG. 14A) of the opening 252 (FIG. 14A) in the channel 244 (FIG. 14A) during normal operation of the handle-integrated hanger 28 (FIG. 1). The outer portions 292 interact with the distal regions 284 (FIG. 14A) of the opening 252 in the channel 244 during over-rotation situations, such as impact events, to provide impact compliance to the garment hanger 36 (FIG. 2). Various embodiments of the protrusion 248 are shown that illustrate various approaches to the contouring of the protrusion 248. The outer portions 292 may have contours that are tuned to provide appropriate dissipation of impact energy that meet the necessary requirements of various safety considerations. For example, the outer portions 292 may have a slope that is gradual or steep depending on various factors, which may include the material that the components of the handle-integrated hanger 28 are made of, expected or calculated impact loads, etc. In some embodiments, the protrusion 248 may be a generally circular or spherical protrusion 248. In such embodiments the channel 244 may include complimentary circular or spherical portions that interact to impede over-rotation of the garment hanger 36. It is contemplated that the channel 244 and the protrusion 248 need not be complementary shapes so long as the interaction between the channel 244 and the protrusion 248 provides the compliance or give discussed herein. For example, the circular or spherical protrusion 248 depicted in FIG. 14B may be utilized with the opening 252 depicted in FIG. 14A without departing from the concepts disclosed herein. In such an embodiment, it may be beneficial to have the diameter of the circular or spherical protrusion 248 be complementary or similar to a height of the central region 280 of the opening 252.

Referring to FIG. 15, the handle-integrated hanger 28 is shown from a top view. More specifically, aspects of the channel 244 of the rotational brake 52 are shown, according to one embodiment. The central region 280 of the channel 244 is flanked on either side by the distal regions 284. The distal regions 284 are shown in phantom. In the depicted embodiment the channel 244 follows the contour of the handle-integrated hanger 28. Said another way, the channel 244 may be linear in some embodiments, while in others the channel 244 may traverse an angled portion as shown in FIG. 15. It is contemplated that the channel 244 may be positioned around an entirety of a circumference and/or perimeter of the handle-integrated hanger 28.

Figure 16B:
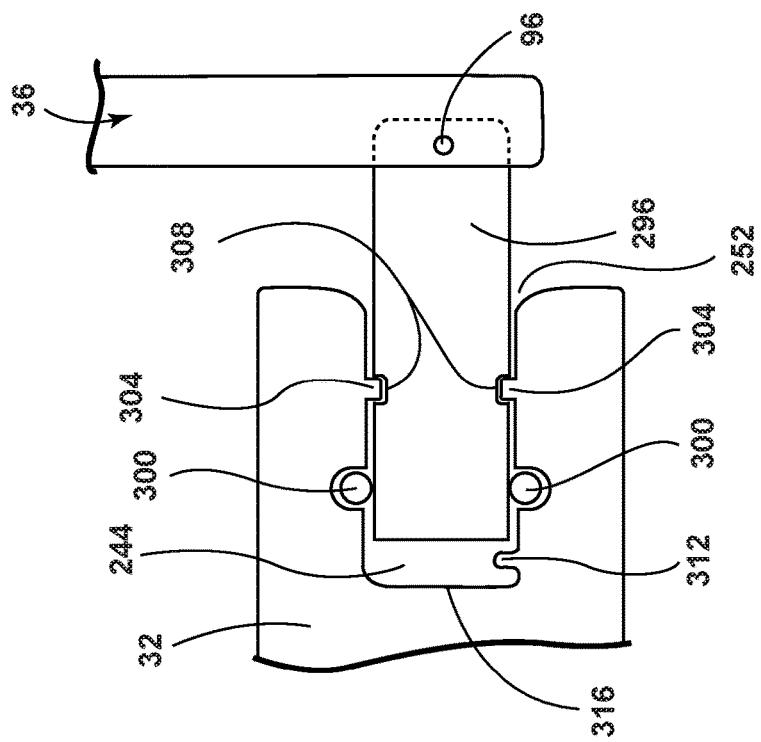
FIG. 16B is an expanded side view of the handle-integrated hanger, taken at region XVIB of FIG. 16A, illustrating the rotational brake, according to one embodiment.
Figure 16A:
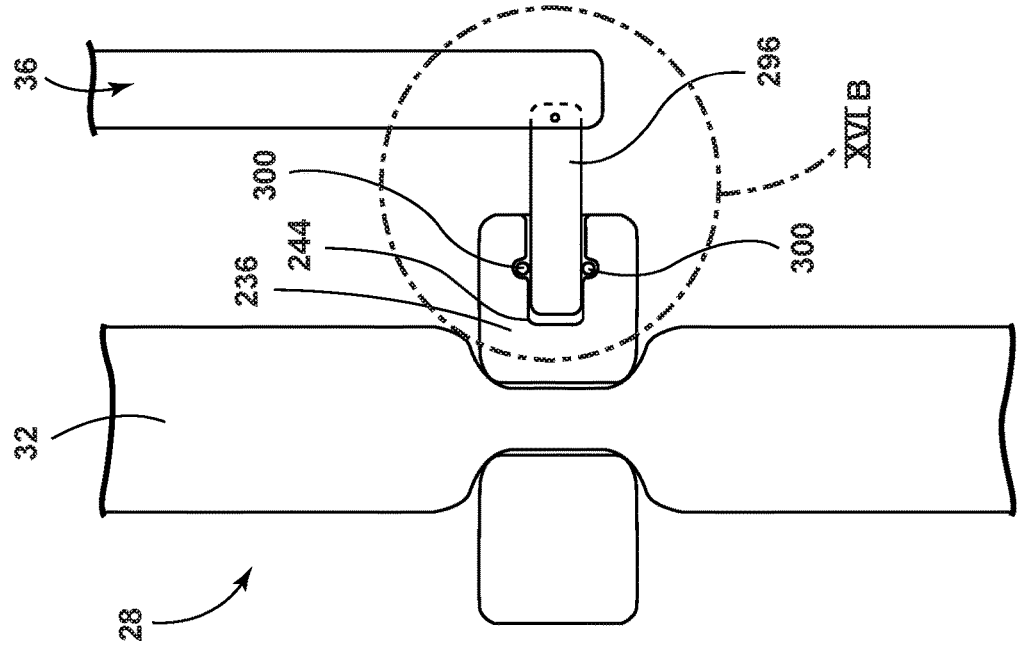
FIG. 16A is a side view of the handle-integrated hanger, according to one embodiment.

Referring now to FIG. 16A, a side view of the handle-integrated hanger 28 is shown, according to one embodiment. The garment hanger 36 may be operably coupled to the grab handle 32 by a coupling portion 296 that engages with the hinge 236. The hinge 236 is shown according to one embodiment. In some embodiments the hinge 236 may rotate about the grab handle 32, while in other embodiments the hinge 236 may be fixed relative to the grab handle 32 and the garment hanger 36 travels within the channel 244 to assume various rotational positions relative to the grab handle 32. The channel 244 may include bearing members 300 that aid in smooth movement of the garment hanger 36 within the channel 244. It is contemplated that the bearing members 300, while depicted as resembling ball bearings, may be a low friction surface that is in direct contact with the garment hanger 36 (e.g., a Teflon® coated surface or surfaces).

Referring to FIG. 16B, the coupling of the garment hanger 36 to the grab handle 32 is shown according to another embodiment. The garment hanger 36 may be coupled to the grab handle 32 by the coupling portion 296. The garment hanger 36 may be pivotably coupled to the coupling portion 296 by the pin 96. The bearing members 300 may be at least partially recessed within the grab handle 32 and/or the coupling portion 296 within the channel 244. The channel 244 may be configured with one or more travel guides 304. The travel guides 304 may extend into the channel 244 from the grab handle 32 and engage with corresponding recessed areas 308 in the coupling portion 296. The travel guides 304 may guide the travel of the garment hanger 36 along a path with a generally spiral shape or that has a radius that continuously decreases as the garment hanger 36 is radially displaced from the radial position associated with the stowed position of the garment hanger 36.

Referring again to FIG. 16B, the channel 244 may be equipped with a raised tab 312 that is positioned between an end of the coupling portion 296 and an inner wall 316 of the channel 244. The raised tab 312 may provide a stop to the inward travel of the coupling portion 296 as the garment hanger 36 traverses the path of the travel guides 304. Additionally or alternatively, the raised tab 312 may give way or break off as yet another avenue for energy absorption during impact events.

Referring now to FIG. 16C, the coupling portion 296 is pivotably coupled to the garment hanger 36 by the pin 96. It may be beneficial to have the channel 244 and the coupling portion 296 taper in a complimentary manner. For example, the channel 244 and the coupling portion 296 may taper from a greater width at the opening 252 of the channel 244 to a smaller width within the channel 244. Alternatively, the channel 244 and the coupling portion 296 may taper from a smaller width at the opening 252 of the channel 244 to a greater width within the channel 244. In either embodiment of the tapered channel 244 and coupling portion 296 the taper may be beneficial due to the increased contact surface area between the channel 244 and the coupling portion 296, thereby increasing the tunability of the resistance to over-rotation. In the embodiment shown, the travel guides 304 may guide the travel of the garment hanger 36 along a path with a generally spiral shape or that has a radius that continuously decreases as the garment hanger 36 is radially displaced from the radial position associated with the stowed position of the garment hanger 36. As the garment hanger 36 traverses the travel guides 304, by engaging the travel guides 304 with the recessed areas 308 of the coupling portion 296, the coupling portion 296 may be drawn inward toward the inner wall 316, for example as the garment hanger 36 begins to over-rotate. It is contemplated that the channel 244 may be manufactured from two separate parts that are held together by an adhesive or epoxy. The adhesive or epoxy may provide further energy absorption as the over-rotating garment hanger 36 separates the two separate parts that create the channel 244 in the grab handle 32.

Mounting surfaces, such as garment hangers, that are typically provided in vehicles 20 tend to be small, are poorly located, and do not allow for the hanging of larger loads of garments. Customers that are dissatisfied with the provided mounting surfaces often purchase aftermarket devices to improve garment storage capacity of the vehicle 20. However, these aftermarket solutions are often poorly integrated into the vehicle 20 and tend to be difficult to stow when not in use. Accordingly, the present disclosure provides a mounting surface, such as the garment hanger 36, that is built into the vehicle 20, is well integrated into the cabin 24 of the vehicle 20, is relatively low cost, does not require complex or special setup, and is capable of carrying and/or supporting larger loads of garments. For example, the garment hanger 36 of the present disclosure may carry and/or support at least about 6, at least about 8, at least about 10, at least about 12, at least about 14, at least about 16, at least about 18, at least about 20, at least about 22, or at least about 24 garments simultaneously.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A handle-integrated hanger comprising:
    a grab handle;
    a garment hanger pivotably coupled to the grab handle at a first end of the garment hanger; and
    a rotational brake that provides a degree of compliance that prevents breakage of the garment hanger due to over-rotation of the garment hanger when the garment hanger is in a deployed position.

2. The handle-integrated hanger of claim 1, wherein the rotational brake further comprises:
    a channel in the grab handle; and
    a protrusion on the garment hanger.

3. The handle-integrated hanger of claim 2, wherein the protrusion has a triangular cross-section.

4. The handle-integrated hanger of claim 2, wherein the protrusion has a rectangular cross-section.

5. The handle-integrated hanger of claim 2, wherein the channel further comprises:
    an opening; and
    a passage, wherein the opening has a width that is greater than a width of the passage.

6. The handle-integrated hanger of claim 5, wherein the channel further comprises:
    a sloped region that tapers from a greater width at an exterior end to a smaller width at an interior end.

7. A handle-integrated hanger comprising:
    a grab handle comprising a vertical section and an angled section, wherein the vertical section transitions to the angled section at an inflection point along a length of the grab handle; and
    a garment hanger pivotably coupled to the grab handle at a first end of the garment hanger, wherein the garment hanger comprises a planar portion and an arcuate portion, and wherein the planar portion of the garment hanger engages with the vertical section of the grab handle and the arcuate portion of the garment hanger engages with the angled section of the grab handle when the garment hanger is in a stowed position.

8. The handle-integrated hanger of claim 7, further comprising:
    a second end of the garment hanger, wherein the second end comprises a semi-circular cross-section that engages with the grab handle in a continuous manner when the garment hanger is in a stowed position.

9. The handle-integrated hanger of claim 8, wherein the garment hanger further comprises:
    one or more apertures.

10. The handle-integrated hanger of claim 9, wherein the garment hanger further comprises:
    one or more trenches, wherein at least one of the trenches corresponds with one of the apertures.

11. The handle-integrated hanger of claim 10, wherein the garment hanger further comprises:

one or more ridges.

12. The handle-integrated hanger of claim 9, wherein the grab handle further comprises:

a tab that protrudes from a surface of the grab handle, wherein the tab engages with one of the apertures when the garment hanger is in the stowed position, and wherein the engagement between the aperture and the tab retains the garment hanger in the stowed position.

13. A handle-integrated hanger comprising:

a grab handle;

a garment hanger pivotably coupled to the grab handle at a first end of the garment hanger, wherein the garment hanger comprises a planar portion and an arcuate portion, wherein the garment hanger pivots in a first plane of rotation and a second plane of rotation relative to the grab handle, and wherein the first plane of rotation and the second plane of rotation are angularly offset from one another; and a rotational brake that prevents over-rotation of the garment hanger in at least one of the first plane of rotation and the second plane of rotation.

14. The handle-integrated hanger of claim 13, wherein the rotational brake further comprises:

a channel in the grab handle; and a protrusion on the garment hanger.

15. The handle-integrated hanger of claim 14, further comprising:

a second end of the garment hanger, wherein the second end comprises a semi-circular cross-section that engages with the grab handle in a continuous manner when the garment hanger is in a stowed position.

16. The handle-integrated hanger of claim 15, wherein the garment hanger further comprises:

one or more apertures.

17. The handle-integrated hanger of claim 16, wherein the garment hanger further comprises:

one or more trenches.

18. The handle-integrated hanger of claim 17, wherein the garment hanger further comprises:

one or more ridges.

19. The handle-integrated hanger of claim 13, wherein the first plane of rotation is defined by a deployment path of the garment hanger moving from a stowed position to a deployed position.

20. The handle-integrated hanger of claim 13, wherein the first plane of rotation and the second plane of rotation are perpendicular to one another.

* * * * *